United States Patent
Rasanen

(10) Patent No.: US 9,716,629 B2
(45) Date of Patent: Jul. 25, 2017

(54) CAPABILITY NEGOTIATION AND CONTROL

(75) Inventor: Juha Antero Rasanen, Espoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 127 days.

(21) Appl. No.: 13/319,525

(22) PCT Filed: Oct. 6, 2010

(86) PCT No.: PCT/EP2010/064954
§ 371 (c)(1),
(2), (4) Date: Nov. 9, 2011

(87) PCT Pub. No.: WO2012/045351
PCT Pub. Date: Apr. 12, 2012

(65) Prior Publication Data
US 2012/0284394 A1    Nov. 8, 2012

(51) Int. Cl.
*G06F 15/173*    (2006.01)
*H04L 12/24*    (2006.01)
(Continued)

(52) U.S. Cl.
CPC ...... *H04L 41/0893* (2013.01); *H04L 41/0873* (2013.01); *H04L 47/20* (2013.01); *H04L 47/14* (2013.01)

(58) Field of Classification Search
CPC . H04L 41/0873; H04L 41/0893; H04L 47/14; H04L 47/20; H04L 12/2602;
(Continued)

(56) References Cited

U.S. PATENT DOCUMENTS 8,718,075 B2 * 5/2014 Cai et al. ............... 370/401
2009/0196225 A1 * 8/2009 Avila Gonzalez et al. ... 370/328
(Continued)

FOREIGN PATENT DOCUMENTS

| KR | 20080070688 A | 7/2008 |
| KR | 20090020087 A | 2/2009 |
| KR | 20100099339 A | 9/2010 |

OTHER PUBLICATIONS

3GPP TS 23.813 v0.3.0, 3rd Generation Partnership Project; Technical Specification Group Services and System Aspects; Study on Policy solutions and enhancements, (Sep. 2010), (Release 10), pp. 1-22.*

(Continued)

*Primary Examiner* — John MacIlwinen
(74) *Attorney, Agent, or Firm* — Squire Patton Boggs (US) LLP

(57) ABSTRACT

It is provided an apparatus, comprising enforcement means having an own capability to enforce a policy for a service, and/or to detect a traffic, and/or to detect the service in a communication system; determining means configured to determine, based on the own capability and a control information on a capability to be controlled for enforcing the policy and/or for detecting the traffic and/or for detecting the service, whether the own capability is to be activated, wherein the control information is received from a steering apparatus; and activating means configured to activate the own capability for the service depending on the determination by the determining means.

26 Claims, 6 Drawing Sheets

(51) Int. Cl.
*H04L 12/813* (2013.01)
*H04L 12/801* (2013.01)

(58) Field of Classification Search
CPC . H04L 43/00; H04L 43/0829; H04L 43/0847; H04L 43/0852; H04L 49/103; H04L 49/201; H04L 49/205; H04L 49/3009; H04L 49/3036; H04L 12/1407; H04L 47/805; H04L 51/063
USPC .......... 709/223–226, 227; 370/259, 230, 252
See application file for complete search history.

(56) References Cited

U.S. PATENT DOCUMENTS

| | | | |
|---|---|---|---|
| 2010/0039941 A1* | 2/2010 | Tan et al. ........................ | 370/241 |
| 2010/0121960 A1* | 5/2010 | Baniel et al. .................. | 709/228 |
| 2010/0186064 A1* | 7/2010 | Huang et al. ..................... | 726/1 |
| 2011/0022702 A1* | 1/2011 | Riley et al. ................... | 709/224 |
| 2011/0035782 A1* | 2/2011 | Xia et al. .......................... | 726/1 |
| 2011/0145895 A1* | 6/2011 | Zhang et al. ...................... | 726/4 |
| 2011/0202653 A1* | 8/2011 | Riley et al. ................... | 709/224 |
| 2012/0099715 A1* | 4/2012 | Ravishankar et al. ... | 379/114.01 |
| 2013/0054800 A1* | 2/2013 | Fernandez Alonso et al. ............................. | 709/224 |

OTHER PUBLICATIONS

ETSI TS 123 203 v9.6.0—Policy and charging control architecture 3GPP TS 23.203 version 9.6.0 Release 9—Oct. 2010—pp. 1-126.*

3rd Generation Partnership Project; Technical Specification Group Services and System Aspect; Study on Policy solutions and enhancements (Release 10); 3GPP TR28.810 v0.4.0 (Oct. 2010)—pp. 1-43.*

3rd Generation Partnership Project; Technical Specification Group Sevices and System Aspects; Policy and charging control architecture (Release 10); 3GPP TS 23.203 V10.00.0 Jun. 2010—pp. 1-126.*

Notice of Allowance dated Dec. 3, 2014, issued in corresponding KR Patent Application No. 10-2011-7030908 (with partial English translation).

International Search Report and Written Opinion corresponding to International Application No. PCT/EP2010/064954 dated Dec. 22, 2010.

Allot Communications et al, "General Definition of the TDF Functionality; Key Issue 4", 3GPP TSG SA WG2 Meeting #79, 3GPP Draft, S2-102557; May 10-14, 2010, Kyoto, Japan, pp. 1-4.

3GPP TS 23.203 V8.11.0, Sep. 2010, Technical Specification, 3rd Generation Partnership Project; Technical Specification Group Services and System Aspects; Policy and charging control architecture (Release 8), pp. 1-115.

3GPP TS 23.813 V0.2.1, Mar. 2010, Techical Report, 3rd Generation Partnership Project; Technical Specification Group Services and System Aspects; Study on Policy Solutions and Enhancements (Release 10), pp. 1-21.

3GPP TSG SA WG2 Meeting #80, TD S2-104443, Aug. 30-Sep. 3, 2010, Brunstad, Norway, Allot Communications et al., "Policy Enhancements, Key Issue 4: way forward and proposed solution", Rel-10, pp. 1-6.

3GPP TR 23.813 V0.3.0, Sep. 2010, Technical Report, 3rd Generation Partnership Project; Technical Specification Group Services and System Aspects; Study on Policy Solutions and Enhancements (Release 10), pp. 1-26.

3GPP TS 29.212 V9.4.0, Sep. 2010, Technical Specification, 3rd Generation Partnership Project; Technical Specification Group Core Network and Terminals; Policy and Charging Control over Gx reference point (Release 9), pp. 1-115.

Ericsson et al, "Details on Alternative 1a of Key Issue Service Awareness and Privacy Policies", 3GPP TSG SA WG2 Meeting #78, TD S2-101167, San Francisco, CA, USA, Feb. 22-26, 2010, pp. 1-5.

LTE for UMTS: OFDMA and SC-FDMA Based Radio Access, by Harri Holma & Antti Toskala, published by John Wiley & Sons, Ltd., 2009, p. 60.

* cited by examiner

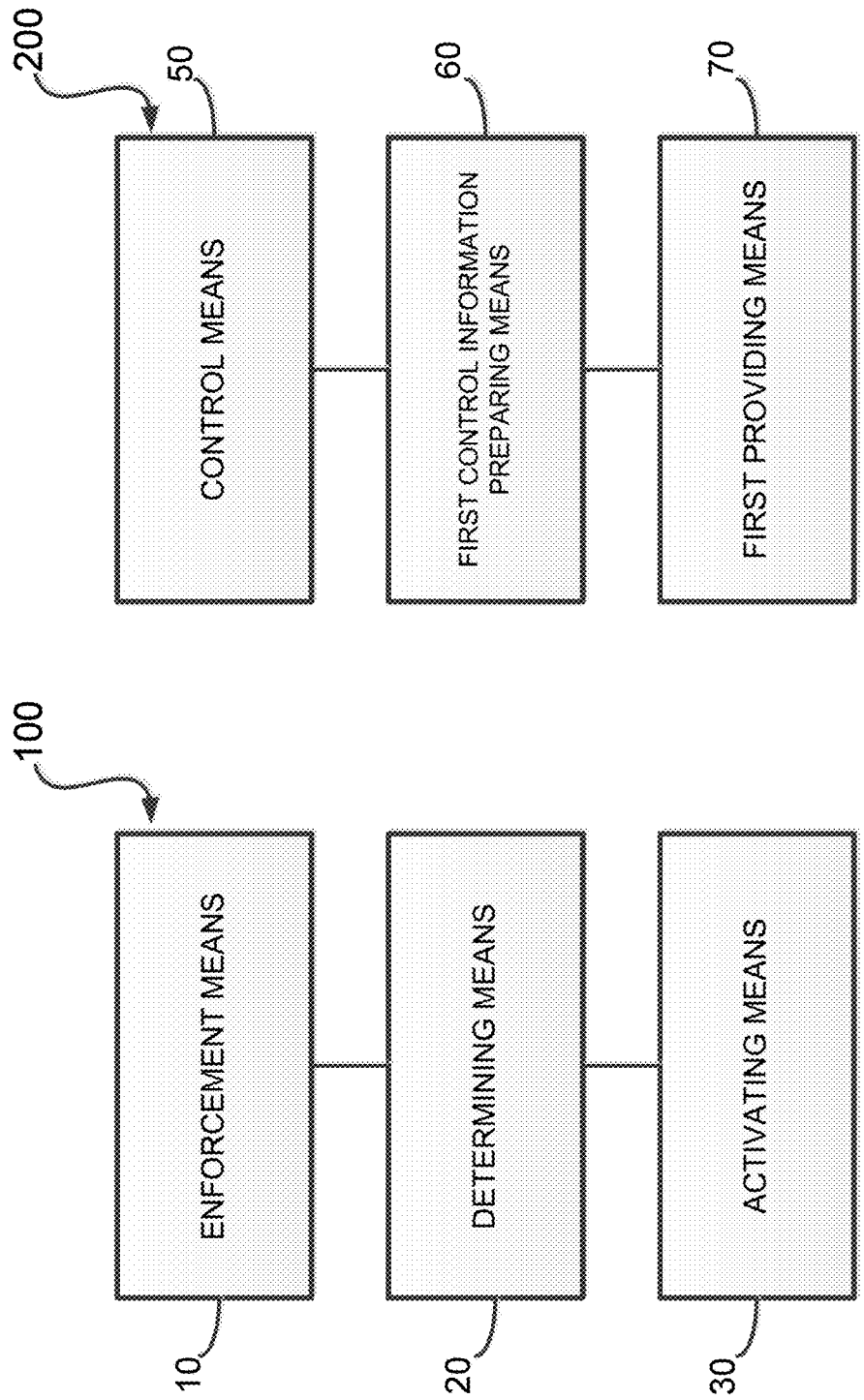

CAPABILITY NEGOTIATION AND CONTROL

FIELD OF THE INVENTION

The present invention relates to an apparatus, a method, a system, and a computer program product related to capability negotiation and control. More particularly, the present invention relates to an apparatus, a method, a system, and a computer program product for capability negotiation and control with respect to policy charging and control.

BACKGROUND OF THE INVENTION

The Evolved Packet System (EPS) is known by the brand name long term evolution (LTE) network. It comprises the E-UTRAN Radio Access network and the Evolved Packet Core (EPC). The $3^{rd}$ generation partnership program (3GPP) is in the process of defining enhancements to the evolved packet system.

Policy and Charging Control (PCC) has a key role in the way users' services are handled. It provides a way to manage the service related connections in a consistent and controlled way. It determines e.g. how bearer resources are allocated for a given service, and quality of service (QoS) characteristics of the bearers. The parameters may be set dynamically for each service and even each user separately. For details of the PCC for 3GPP release 8, see 3GPP technical specification (TS) 23.203.

FIG. 1 shows the PCC functions and interfaces in one operator's network of 3GPP release 8 (taken from H. Holma and A. Toskalla, "LTE for UMTS", John Wiley & Sons, (2009)).

A user equipment (UE) signals a request for a service in the Service Layer, and the application function (AF) residing in that layer contacts the Policy and Charging Rules Function (PCRF) for appropriate bearer resources via the Rx interface. The PCRF is in charge of meeting decisions on what PCC to use for the service. If subscriber specific policies are used, the PCRF may enquire the subscriber related policies from the subscription profile repository (SPR) via the Sp interface.

The packet data network gateway (P-GW) comprises e.g. the Policy and Charging Enforcement Function (PCEF). The PCRF pushes the PCC rules to the PCEF via the Gx interface. The PCEF is responsible for enforcing the PCC rules, e.g. setting up the corresponding dedicated bearers, modifying the existing bearers, ensuring that only authorized service flows are allowed, and QoS limits are not exceeded.

3GPP SA2 has a Rel-10 study item on "*Policy solutions and enhancements*". Studied items are documented in technical report TR 23.813. Key issue 4 "*Service Awareness and Privacy Policies*" of the study deals with the traffic detection for policy and charging control purposes. The traffic detection functionality may be implemented either as collocated with PCEF or as a standalone entity. The standalone solution aims at avoiding performance and scalability problems that may occur in a solution where the traffic detection is integrated in the same entity/gateway with the PCEF.

When there is no interaction between the application function AF and PCRF, the network may not be aware of the usage of such services by the UE even though the network may have defined policies related to the services. User experience can be enhanced, if the network becomes aware of such services and the network is able to apply service specific policies.

Traffic Detection Function (TDF), based on deep packet inspection, can be applied in a network to support policy and charging control (by PCRF) for services for which the PCRF does not get related service information from an AF/P-CSCF. Such conditions may occur for example when the AF does not have an interface to the PCRF (refer to the Rx interface between AF/P-CSCF and PCRF; P-CSCF: Proxy call session control function) or when there is no explicit service level signaling and hence no interaction between the Application Function (AF) and PCRF or when filters related to a service have not been installed in the PCEF.

The TDF indicates the start and stop of the detected services to the PCRF. The PCRF provisions/modifies/deletes PCC rules for the detected service.

The use of the service traffic detection mechanism may be combined with privacy policies (as suggested in the draft TR 23.813 by 3GPP SA2), i.e. the PCRF shall check upon an IP-CAN session establishment whether the use of the traffic detection mechanism is allowed for a given user, and if yes, which services shall be monitored and detected. The PCRF then instructs the TDF on which services it should detect and report.

Furthermore, the use of the service traffic detection mechanism, in particular if combined with privacy policies, may require user/subscriber consent, and for this purpose the PCC architecture has to be extended to include user privacy policies (e.g. the PCRF should check the subscription data in the SPR upon an internet protocol-connectivity access network (IP-CAN) session establishment, if the PCEF indicates the support of the traffic detection function).

Gx and Rx based interfaces are proposed in the TR 23.813 as candidates for the interface between the PCRF and TDF. When TDF and PCEF are collocated, the Gx based solution would be an extension to the current Gx interface/protocol and an Rx based solution would mean an extra Rx based protocol (in addition to Gx) between the TDF/PCEF and PCRF. A standalone TDF would mean a new (possibly Gx or Rx based) protocol between the standalone TDF and PCRF.

For example, according to 3GPP technical report (TR) 23.813 v0.3.0, the following enforcement actions may be applied to the traffic by the PCEF:
  a. Permit Unrestricted—the detected service/flow is allowed to continue without further policy action
  b. Block—the detected service/application flows are blocked (or the "gate is closed")
  c. Shape—apply some regime of traffic shaping to the detected service/application flows (e.g. to bandwidth limit for P2P file sharing flows)
  d. Redirection—Redirect detected flows to another controlled address (e.g. redirect to a top-up/service provisioning page). This may not be possible for all types of detected flows (e.g. this may only be performed on specific HTTP based flows).

Such policy enforcement actions (e.g. gating, shaping, redirection) may be activated immediately at the TDF after the detection of a given service. Normally these enforcement actions are performed by the PCEF.

In the context of this application, the ability to perform such and other related enforcement actions are named capabilities.

SUMMARY OF THE INVENTION

It is an object of the present invention to improve the prior art.

In particular, by the present invention, a solution to some problems related to distributed policy enforcement is provided.

More in detail, some policy enforcement actions may be supported by two different network elements, such as PCEF/GW and TDF server, in particular when a standalone TDF is supported in a network. Even the traffic and/or service detection may be supported by two different network elements (e.g. PCEF, TDF), the extent of the support possibly being different, i.e. one network element being capable of detecting certain services (=service set 1) and the other network element being capable of detecting another set of services (=service set 2) possibly at least partly different and partly the same as the services of service set 1. In future practically any capability may be supported by one or more than one network element in a communication system.

In order to optimize performance and scalability, overlapping capabilities should not be activated in two entities of a communication system.

However, there is no mechanism between e.g. the PCEF and TDF on how to agree on which actions are performed, i.e. which capabilities are applied/activated, by the one and the other entity.

According to a first aspect of the invention, there is provided an apparatus, comprising enforcement means having an own capability to enforce a policy for a service, and/or to detect a traffic, and/or to detect the service in a communication system; determining means configured to determine, based on the own capability and a control information on a capability to be controlled for enforcing the policy and/or for detecting the traffic and/or for detecting the service, whether the own capability is to be activated, wherein the control information is received from a steering apparatus; and activating means configured to activate the own capability for the service depending on the determination by the determining means.

In the apparatus, the determining means may be configured not to activate the own capability if it corresponds to the capability to be controlled.

In the apparatus, the determining means may be configured to determine to activate the own capability for the service if the own capability corresponds to the capability to be controlled.

The apparatus may further comprise providing means configured to provide an information about the own capability to the steering apparatus.

According to a second aspect of the invention, there is provided an apparatus, comprising control means configured to control a policy for a service in a communication system; first control information preparing means configured to prepare a first control information about a drain capability to be controlled for enforcing the policy and/or for detecting a traffic and/or for detecting the service, wherein the first control information is based on a source capability information received from a source apparatus; and first providing means configured to provide, to a drain apparatus, the first control information, wherein the source apparatus is different from the drain apparatus.

The apparatus may further comprise detecting means configured to detect that a request for a source call control of the service is received from the source apparatus and a request for a drain call control of the service is received from the drain apparatus; and the first control information preparing means may be configured to prepare the first control information only, if it is detected that both the request for the drain call control and the request for the source call control are received.

In the apparatus, the first control information preparing means may be configured to prepare the first control information such that it depends on whether or not the source capability information corresponds to a drain capability information received from the drain apparatus.

The apparatus may further comprise second control information preparing means configured to prepare, a second control information about a source capability to be controlled for enforcing the policy, wherein the second control information is based on the drain capability information; and second providing means configured to provide, to the source apparatus, the second control information.

In the apparatus, the second control information preparing means may be configured to prepare the second control information such that it depends on whether or not the drain capability information corresponds to the source capability information.

In the apparatus, the first control information preparing means may be configured to prepare the first control information additionally based on at least one of a relative priority between the source apparatus and the drain apparatus, and/or a user profile of a user accessing the service.

In the apparatus, the first control information may comprise an instruction to activate the drain capability to be controlled.

According to a third aspect of the invention, there is provided a method, comprising enforcing, by an own capability, a policy for a service in a communication system and/or detecting a traffic and/or detecting the service; determining, based on the own capability and a control information on a capability to be controlled for enforcing the policy and/or for detecting a traffic and/or for detecting the service, whether the own capability is to be activated, wherein the control information is received from a steering apparatus; and activating the own capability for the service depending on the determination by the determining means.

The method may be an enforcing method.

In the method, it may be determined not to activate the own capability if it corresponds to the capability to be controlled.

In the method, it may be determined to activate the own capability for the service if the own capability corresponds to the capability to be controlled.

The method may further comprise providing an information about the own capability to the steering apparatus.

According to an fourth aspect of the invention, there is provided a method, comprising controlling a policy for a service in a communication system and/or detecting a traffic and/or detecting the service; preparing a first control information about a drain capability to be controlled for enforcing the policy, wherein the first control information is based on a source capability information received from a source apparatus; and providing, to a drain apparatus, the first control information, wherein the source apparatus is different from the drain apparatus.

The method may be a controlling method.

The method may further comprise detecting that a request for a source call control of the service is received from the source apparatus and a request for a drain call control of the service is received from the drain apparatus; and the first control information may be prepared only, if it is detected that both the request for the drain call control and the request for the source call control are received.

In the method, the first control information may be prepared such that it depends on whether or not the source capability information corresponds to a drain capability information received from the drain apparatus.

The method may further comprise preparing a second control information about a source capability to be controlled for enforcing the policy, wherein the second control information is based on the drain capability information; and providing, to the source apparatus, the second control information.

In the method, the second control information may be prepared such that it depends on whether or not the drain capability information corresponds to the source capability information.

In the method, the first control information may be prepared additionally based on at least one of a relative priority between the source apparatus and the drain apparatus, and/or a user profile of a user accessing the service.

In the method, the first control information may comprise an instruction to activate the drain capability to be controlled.

According to a fifth aspect of the invention, there is provided a computer program product comprising computer-executable components which perform, when the program is run on a computer, the execution of which result in operations of the method according to any of the seventh and eighth aspect.

The computer program product may be embodied as a computer-readable storage medium.

According to a sixth aspect of the invention, there is provided an apparatus, comprising enforcement processor having an own capability to enforce a policy for a service, and/or to detect a traffic, and/or to detect the service in a communication system; determining processor configured to determine, based on the own capability and a control information on a capability to be controlled for enforcing the policy and/or for detecting the traffic and/or for detecting the service, whether the own capability is to be activated, wherein the control information is received from a steering apparatus; and activating processor configured to activate the own capability for the service depending on the determination by the determining means.

In the apparatus, the determining processor may be configured not to activate the own capability if it corresponds to the capability to be controlled.

In the apparatus, the determining processor may be configured to determine to activate the own capability for the service if the own capability corresponds to the capability to be controlled.

The apparatus may further comprise providing processor configured to provide an information about the own capability to the steering apparatus.

According to a seventh aspect of the invention, there is provided an apparatus, comprising control processor configured to control a policy for a service in a communication system; first control information preparing processor configured to prepare a first control information about a drain capability to be controlled for enforcing the policy and/or for detecting a traffic and/or for detecting the service, wherein the first control information is based on a source capability information received from a source apparatus; and first providing processor configured to provide, to a drain apparatus, the first control information, wherein the source apparatus is different from the drain apparatus.

The apparatus may further comprise detecting processor configured to detect that a request for a source call control of the service is received from the source apparatus and a request for a drain call control of the service is received from the drain apparatus; and the first control information preparing processor may be configured to prepare the first control information only, if it is detected that both the request for the drain call control and the request for the source call control are received.

In the apparatus, the first control information preparing processor may be configured to prepare the first control information such that it depends on whether or not the source capability information corresponds to a drain capability information received from the drain apparatus.

The apparatus may further comprise second control information preparing processor configured to prepare, a second control information about a source capability to be controlled for enforcing the policy, wherein the second control information is based on the drain capability information; and second providing processor configured to provide, to the source apparatus, the second control information.

In the apparatus, the second control information preparing processor may be configured to prepare the second control information such that it depends on whether or not the drain capability information corresponds to the source capability information.

In the apparatus, the first control information preparing processor may be configured to prepare the first control information additionally based on at least one of a relative priority between the source apparatus and the drain apparatus, and/or a user profile of a user accessing the service.

In the apparatus, the first control information may comprise an instruction to activate the drain capability to be controlled.

According to an eighth aspect of the invention, there is provided a policy enforcement point, comprising an apparatus according to the first or sixth aspect.

According to a ninth aspect of the invention, there is provided a policy control point, comprising an apparatus according to the second or seventh aspect.

According to a tenth aspect of the invention, there is provided a system, comprising a drain apparatus according to the first aspect or the sixth aspect; and the steering apparatus of the drain apparatus, wherein the steering apparatus has a source capability to enforce the policy for the service and/or to detect a traffic and/or to detect the service and is configured to provide, to the drain apparatus, the control information, and wherein the control information is related to the source capability.

According to an eleventh aspect of the invention, there is provided a system, comprising a control apparatus according to the second or seventh aspect; the drain apparatus of the control apparatus, and the source apparatus of the control apparatus, wherein the drain apparatus has a drain capability to enforce the policy for the service and/or to detect the traffic and/or to detect the service and is configured to activate the drain capability on response to the first control information, the source apparatus has a source capability to enforce the policy for the service and/or to detect a traffic and/or to detect the service and is configured to provide, to the control apparatus, the source capability information, and the source capability information is related to the source capability.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 5 shows an enforcement apparatus according to an embodiment of the invention;

FIG. 6 shows a control apparatus according to an embodiment of the invention;

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In some embodiments of the invention, PCEF and TDF indicate their capabilities, and based on these indications, it is decided which of PCEF and TDF activates a specific capability.

For example, PCEF and TDF may indicate their capabilities, such as policy enforcement, traffic and/or service detection etc., to the PCRF upon contacting the PCRF after the default/primary context establishment between the UE and the network.

Figure 8:
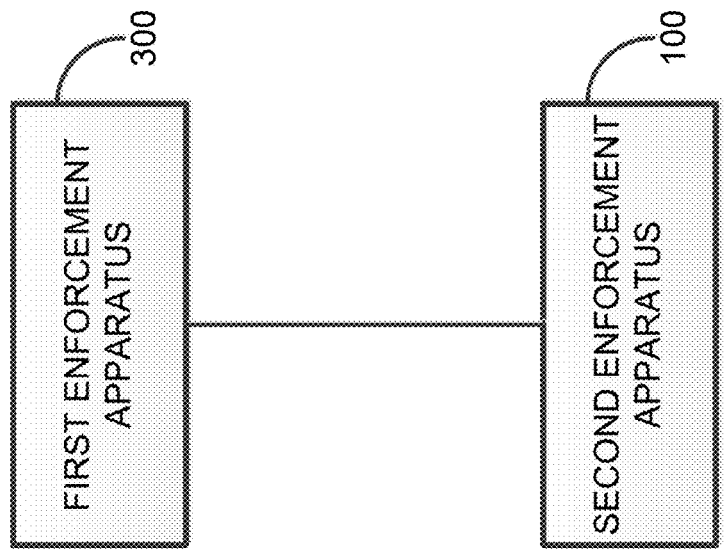
FIG. 8 shows another system according to an embodiment of the invention.

FIG. 8 shows a first system according to an embodiment of the invention. The system comprises a first enforcement apparatus 300, also called "source apparatus", and a second enforcement apparatus 100 according to an embodiment of the invention, which is also called "drain apparatus". The methods corresponding to those of FIGS. 2 and 3 without involvement of the PCRF as explained below may be performed in this system.

In the following, it is assumed that PCEF is enforcement apparatus 100, and TDF is enforcement apparatus 300, but the roles of PCEF and TDF may be interchanged.

Figure 1:
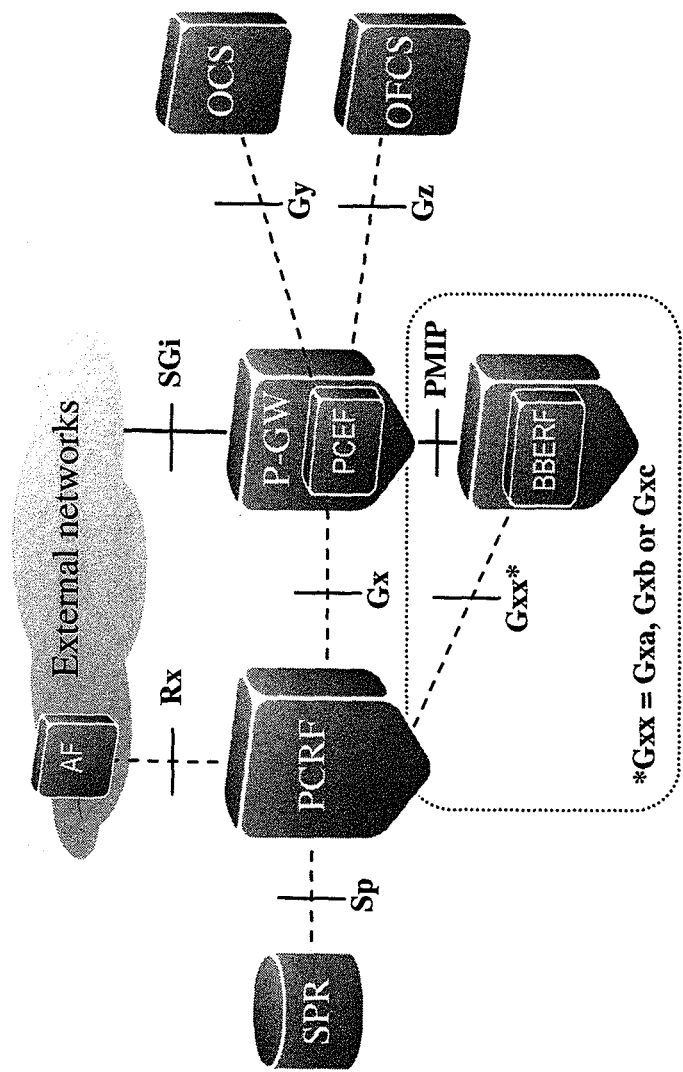
FIG. 1 shows a PCC architecture according to 3GPP release 8.
Figure 2:
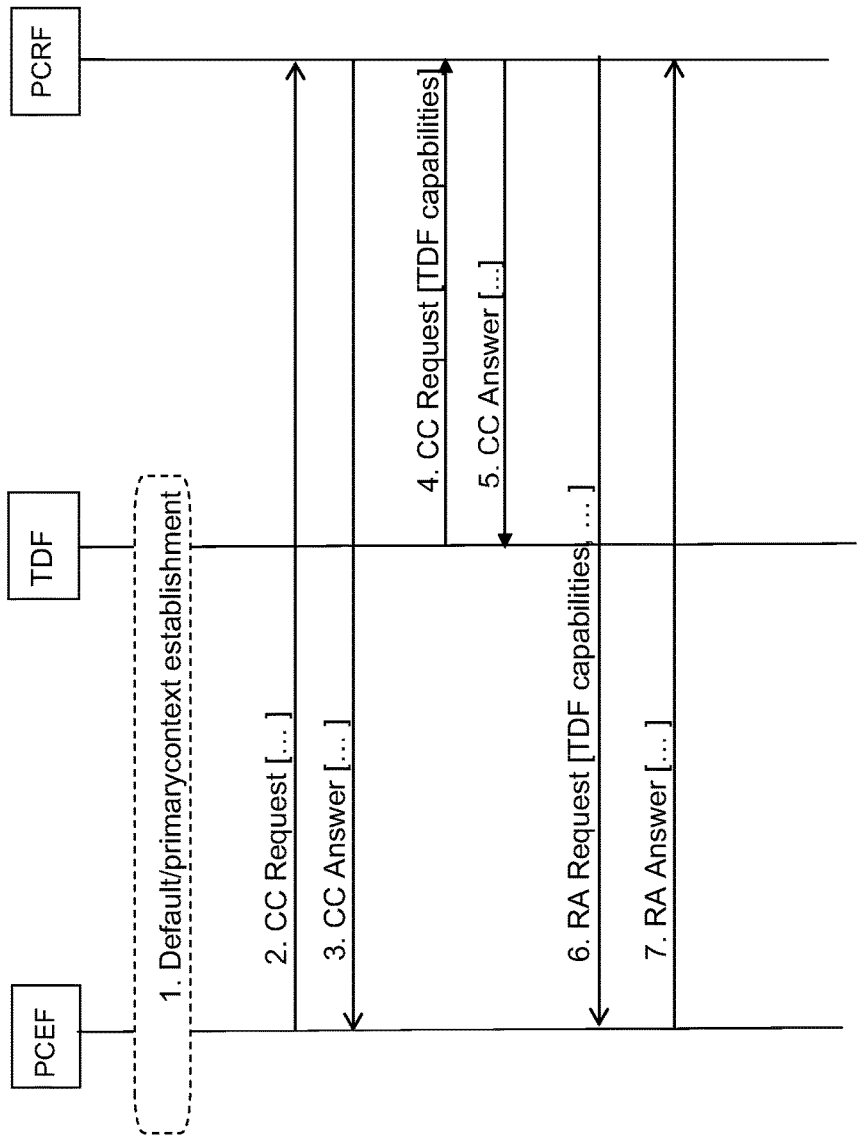
FIG. 2 shows a first method according to an embodiment of the invention.

FIG. 2 shows a method according to an embodiment of the invention. In this embodiment, each TDF capability has priority over the corresponding one of the PCEF.

According to step 1, a UE establishes a default/primary context with the network for a given service as known in the prior art.

In step 2, PCEF sends a request message (CC Request) to the PCRF to get informed about the policy to be applied to the service (and for the user, if the user specific policies are supported). The PCRF sends back CC answer (step 3). The CC request of the PCEF may or may not comprise information about PCEF's capabilities.

Steps 4 and 5 for the TDF correspond to steps 2 and 3 of the PCEF. However, different to step 2, in step 4 the TDF indicates its capabilities which the TDF intends to apply to the service. Thus, the PCRF is aware of them. An alternative way for steps 4 and 5 is that the PCRF sends a request message to the TDF and the TDF indicates its capabilities in the answer message to the PCRF.

In step 6, the PCRF informs the PCEF about the activated TDF's capabilities in a request message (RA request), which is answered in step 7. Based on the information about the activated TDF's capabilities, the PCEF activates its own capabilities for the service. For example, the PCEF may deactivate all capabilities which are activated by the TDF, or may adapt the application of some of its capabilities such that they fit better to the activated TDF's capabilities.

As a result of this embodiment, it is avoided that the same capability is applied twice to a service. Thus, the overall performance of the network is enhanced. In addition, it may be ensured that the applied capabilities of TDF and PCEF fit to each other.

Figure 3:
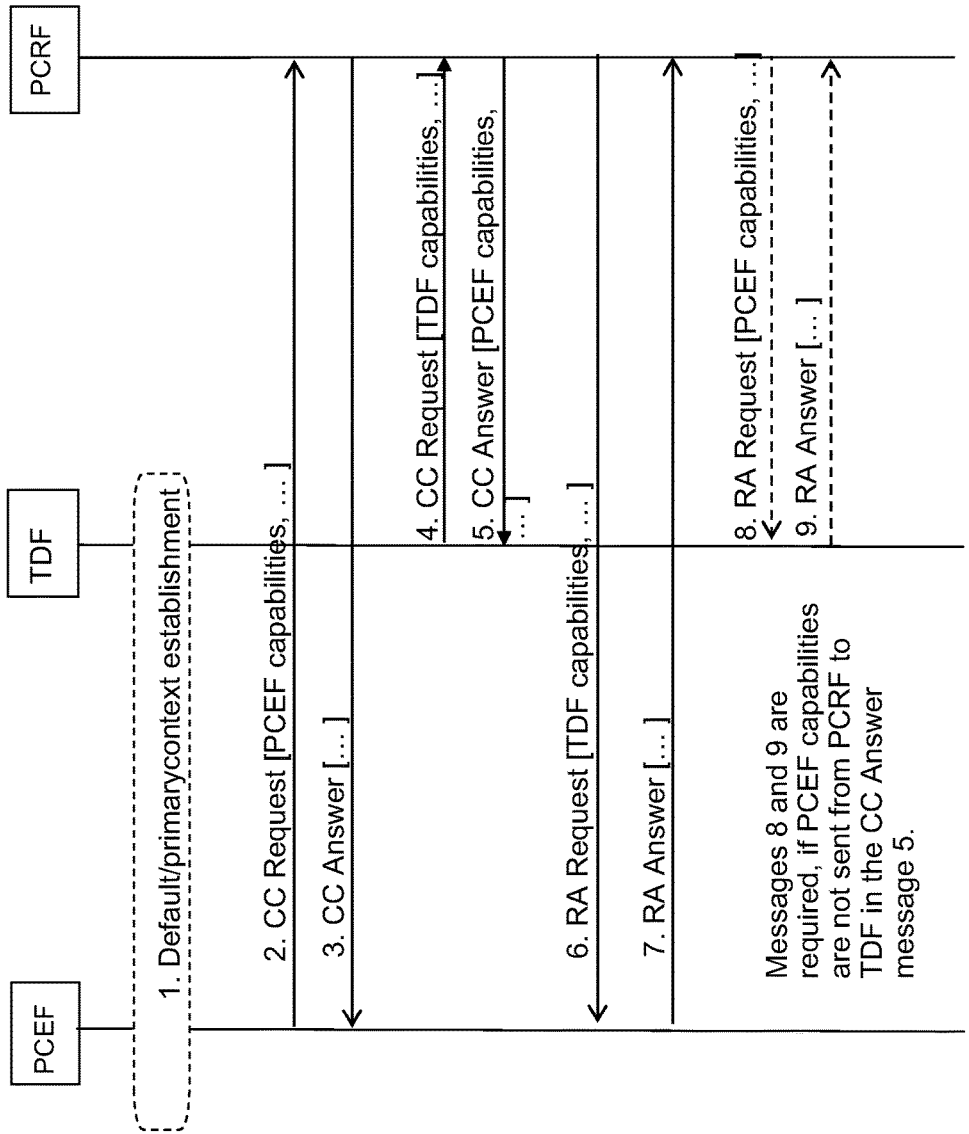
FIG. 3 shows a second method according to an embodiment of the invention.

FIG. 3 shows another method according to an embodiment of the invention. This method is quite similar to that of FIG. 2, however, some TDF capabilities may not have priority over corresponding PCEF capabilities.

In this embodiment, both PCEF and TDF indicate their capabilities to the PCRF (steps 2 and 4), which may forward them to the respective other entity (steps 5 and 6 or steps 5 and 8). In detail, the PCRF may send the capabilities of the PCEF further to the TDF and the capabilities of the TDF further to the PCEF, either in a separate request/command or in an acknowledgement/reply to a request. An alternative way for steps 4 and 5 is that the PCRF sends a request message indicating the PCEF capabilities to the TDF and the TDF indicates its capabilities in the answer message to the PCRF.

If both the PCEF and the TDF support a same capability, either the PCEF or the TDF may determine which one applies/activates the capability that is supported by both the PCEF and TDF. That is, either the PCEF or the TDF may have a higher priority for a given capability.

In some embodiments, the priority/priorities may be indicated with the capability/capabilities in the negotiation message. For example, the PCRF may provide the priorities e.g. based on a predefined table or based on some other detection result such as the current traffic load or processor load on some entities, or a combination of such criteria.

In some other embodiments, the priorities may be defined in the PCEF and TDF. For example, the priorities may be predefined in respective tables in the PCEF and TDF, or be determined based on some actual conditions (e.g. traffic load or processor load), or a combination thereof, respectively. Preferably, the conditions can be locally determined by the PCEF and TDF, respectively.

In this case, if the priorities are the same for a given capability in the PCEF and TDF, there may be a predefined rule that one of PCEF and TDF has prevalence over the other for equal priorities. That is, for a capability with same priority in PCEF and TDF, it is determined in advance, which of the entities will activate the capability and which not.

Alternatively or in addition, one of the entities may inform the other one whether or not it will activate a capability with equal priorities. Such decision may be met based on predefined rules or based on some other—preferably local—conditions (e.g. traffic load or processor load), or a combination thereof. The other entity then has to activate or deactivate the capability in response to this information. The information may be send via the PCRF in further request message.

In the context of this application, deactivation means undo the activation if the capability is activated, or not activating the capability if it is not activated yet.

Preferably, the PCRF forwards the information about the capability of the TDF only if the PCRF detects that control requests for the same service are detected from both the PCEF and TDF. Thus, it will reduce the load on PCEF and TDF and their links to PCRF, when no such forwarding takes place if only one of the entities may be involved in the policy enforcement or traffic and/or service detection.

In the scenarios outlined hereinabove, the PCRF is involved in negotiating which entity activates which capability. However, according to some embodiments, similar to those described with respect to FIGS. 2 and 3, the PCRF may not be involved in the negotiation. For example, the TDF may activate all its relevant capabilities and send its capability information directly to the PCEF, and the PCEF decides which own capabilities to activate, based on the information received from the TDF. In another embodiment, the roles of PCEF and TDF in this scenario may be interchanged. In these scenarios, an interface between PCEF and TDF is required. Such an interface may be based e.g. on present Rx or Gx interfaces.

While such scenarios may reduce the load of the PCRF, on the other side, involving the PCRF might reduce the load on PCEF and TDF because the PCRF may filter out those request messages where only one of PCEF and TDF is involved and, therefore, no decision on the entity to activate a capability is to be met.

Figure 7:
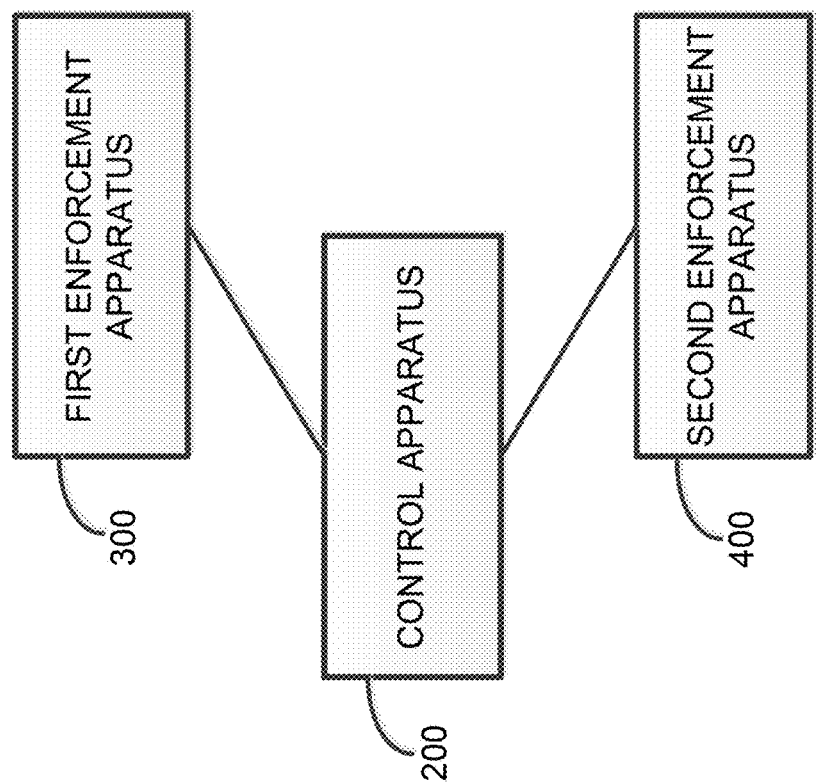
FIG. 7 shows a system according to an embodiment of the invention.

FIG. 7 shows a second system according to an embodiment of the invention. The system comprises a control apparatus 200 such as a PCRF of an embodiment of the invention, and two enforcement apparatuses 300, 400, such as a PCEF and a TDF. Enforcement apparatus 300 is also called "source apparatus", and enforcement apparatus 100 is also called "drain apparatus". In the second system, a method as according to FIG. 4 may be performed.

In the following, it is assumed that PCEF is enforcement apparatus 400, and TDF is enforcement apparatus 300, but the roles of PCEF and TDF may be interchanged.

Figure 4:
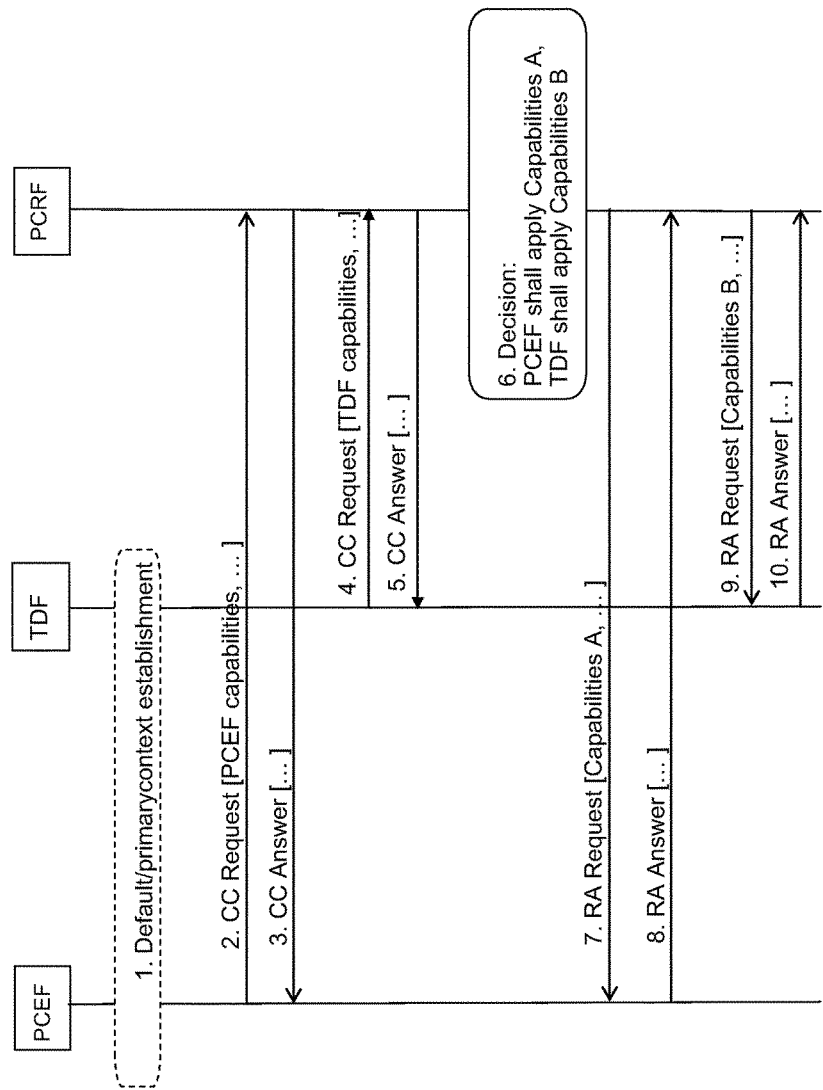
FIG. 4 shows a third method according to an embodiment of the invention.

FIG. 4 shows a method according to another embodiment of the invention. Steps 1 to 5 correspond to the corresponding ones of FIG. 3, the PCEF and TDF indicating their capabilities to the PCRF. Here again, an alternative way for steps 4 and 5 is that the PCRF sends a request message to the TDF and the TDF indicates its capabilities in the answer message to the PCRF.

According to step 6, which is preferably only performed if the PCRF receives CC requests from both the PCEF and the TDF, the PCRF decides which of PCEF and TDF shall apply which capability. That is, the PCRF decides on a set A of capabilities to be performed by the PCEF, and a set B of capabilities to be performed by the TDF. The decision may be based on predefined tables or on actual conditions such as traffic load or processor load, or a combination thereof.

If both the PCEF and the TDF support a same capability, the PCRF determines which one applies/activates the capability that is supported by both the PCEF and TDF.

The PCRF sends the capability activation instructions to the PCEF and TDF, either in a separate request/command (as in FIG. 4) or in an acknowledgement/reply to a request.

The capability negotiation/indication may also indicate that a certain capability is not supported by an entity and should be supported by the other entity, or that a certain capability is supported to a certain extent (e.g. certain shaping measures, or traffic detection or detection of certain services) and the entity having a better support should apply/activate the capability or should apply/activate the parts of the capability not supported by the other entity.

FIG. 5 shows an enforcement apparatus 100 according to an embodiment of the invention. In a system according to FIG. 7, the enforcement apparatus may be a drain apparatus.

The enforcement apparatus may comprise a PCEF or TDF function, such as enforcement means 10, which has an own capability to enforce a policy for a service in the communication network.

The determining means 20 is configured to determine whether or not the own capability has to be activated for a service and, where applicable, for a given user. A default/primary context with the enforcement apparatus may have been established for this service. The determining is met based on received information on a capability to be controlled for enforcing the policy.

For example, the received information may only comprise an indication, and based on the indication and—in addition—on the own capabilities of the enforcement apparatus, the determining means may decide which own capabilities to activate and which not. More precisely, in an embodiment, the indication may comprise information on a capability supported for that service by another apparatus different from the enforcement apparatus. In this case, if the capability supported by the other apparatus corresponds to the own capability, the determining means may determine to deactivate its corresponding own capability. On the other hand, if the two capabilities do not correspond to each other, the determining means may determine to activate the own capability or the parts of the capability not supported by the other entity.

In other embodiments, the received information may comprise instructions, which own capabilities are to be activated and/or deactivated by the apparatus. In this case, determining means reading and processing the instructions, such that the activating means 30 is correspondingly instructed to activate or deactivate the capability.

The activating means 30 is configured to activate the own capability if activating is determined by the determining means and/or to deactivate the own capability if deactivating is determined by the determining means.

FIG. 6 shows a control apparatus 200 according to an embodiment of the invention.

The control means 50 is configured to control a policy for a service and, where applicable, for a user. The control means 50 may comprise a policy and charging rules function.

The first control information preparing means 60 is configured to prepare a control information. With the control information, the drain apparatus will get an indication what capabilities to activate or not. The control information is based on a capability information received from the source apparatus.

For example, the control information may comprise the capability information of the source apparatus. Thus, the control apparatus may leave the decision to the drain apparatus whether or not to activate a capability in the drain apparatus.

In another embodiment, the first control information preparing means 60 may determine which capabilities are supported by the source apparatus, and prepare a control information indicating a capability which the drain apparatus should activate or deactivate. Also, the control information may comprise instructions to activate a capability with certain restrictions or modifications.

By the first providing means 70, the control information is provided to the drain apparatus.

The control apparatus may comprise a detecting means configured to detect whether a request for a control for a service and, where applicable, for a user is received from two different enforcement apparatuses, such as TDF and PCEF (in general: from a source apparatus and a drain apparatus different from each other). Thus, the load on the enforcement apparatuses may be reduced.

In some embodiments of the invention, activation of some capabilities is decided by an enforcement point such as PCEF, TDF, according to a system shown in FIG. 8, and activation of other capabilities is decided by a control point such as a PCRF, as according to a system shown in FIG. 7.

Note that the operable connections shown in the Figures are functional connections. Physical connections on which the functional connections rely may differ from the latter.

Furthermore, if not otherwise stated or otherwise made clear from the context, the statement that two entities are different means that they are differently addressed in the communication network. It does not necessarily mean that they are based on different hardware. That is, each of PCEF, TDF and PCRF may be based on a different hardware, or some or all of the entities may be based on the same hardware.

Some embodiments are described with respect to an LTE network hereinabove. However, embodiments of the invention are not limited to LTE networks, and may be implemented in other communication systems including fixed and mobile communication systems of different standards, too.

Furthermore, in some embodiments, instead of PCEF and/or TDF, other enforcement points may be implemented. Instead of PCRF, other control points may be used.

According to the above description, it should thus be apparent that exemplary embodiments of the present invention provide, for example an enforcement means such as a PCEF or a TDF, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a policy control function such as a PCRF, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
   at least one processor; and
   at least one memory including computer program code,
   wherein the at least one memory and the computer program code are configured to, with the at least one processor, cause the apparatus at least to
   determine whether a policy and charging enforcement function's (PCEF) own capability is to be activated,
   based on the PCEF's own capability to enforce a policy for a service, and/or to detect a traffic, and/or to detect the service in a communication system,
   based on information of a capability of a traffic detection function to enforce the policy, and/or detect the traffic, and/or to detect the service in a communication system, and
   based on a control information on a capability to be controlled for enforcing the policy, and/or for detecting the traffic, and/or for detecting the service,
   wherein the control information is received from a steering apparatus; and
   activate the PCEF's own capability for the service depending on the determination.

2. The apparatus according to claim 1, wherein
   the at least one memory and the computer program code are configured to, with the at least one processor, cause the apparatus at least to activate the PCEF's own capability if it corresponds to the capability to be controlled.

3. The apparatus according to claim 1, wherein
   the at least one memory and the computer program code are configured to, with the at least one processor, cause the apparatus at least to determine to activate the PCEF's own capability for the service if the PCEF's own capability corresponds to the capability to be controlled.

4. The apparatus according to claim 1, wherein the at least one memory and the computer program code are configured to, with the at least one processor, cause the apparatus at least to provide an information about the PCEF's own capability to the steering apparatus.

5. A policy enforcement point, comprising an apparatus according to claim 1.

6. A system, comprising
   a drain apparatus according to claim 1; and
   the steering apparatus of the drain apparatus, wherein
   the steering apparatus has a source capability to enforce the policy for the service and/or to detect a traffic and/or to detect the service and is configured to provide, to the drain apparatus, the control information, and wherein
   the control information is related to the source capability.

7. The apparatus according to claim 1, wherein the at least one memory and the computer program code are configured to, with the at least one processor, cause the apparatus at least to determine whether the PCEF's own capability is to be activated based on the PCEF's own capability and another capability to enforce a policy for a service, and/or to detect a traffic, and/or to detect the service in a communication system of an enforcement apparatus.

8. An apparatus, comprising:
   at least one processor; and
   at least one memory including computer program code,
   wherein the at least one memory and the computer program code are configured to, with the at least one processor, cause the apparatus at least to prepare a first control information about a drain capability to be controlled for enforcing a policy, and/or for detecting a traffic, and/or for detecting a service, provide, to a traffic detection function, the first control information, wherein a policy and charging enforcement function is different from the traffic detection function, detect that a request for a source call control of the service is received from the policy and charging enforcement function and a request for a drain call control of the service is received from the traffic detection function, wherein the first control information is based on a source capability information received from the policy and charging enforcement function, wherein the first control information is prepared only if it is detected that both the request for the drain call control and the request for the source call control are received, and wherein if the first control information is not provided to the traffic detection function, the at least one memory and the computer program code are configured to, with the at least one processor, cause the apparatus at least to provide, to the traffic detection function, a second control information about a source capability to enforce a policy for a service, and/or to detect a traffic, and/or to detect the service.

9. The apparatus according to claim 8, wherein the at least one memory and the computer program code are configured to, with the at least one processor, cause the apparatus at least to prepare the first control information such that it depends on whether or not the source capability information corresponds to a drain capability information received from the traffic detection function.

10. The apparatus according to claim 9, wherein the at least one memory and the computer program code are configured to, with the at least one processor, cause the apparatus at least to prepare, a second control information about a source capability to be controlled for enforcing the policy, wherein the second control information is based on the drain capability information; and provide, to the policy and charging enforcement function, the second control information.

11. The apparatus according to claim 10, wherein the at least one memory and the computer program code are configured to, with the at least one processor, cause the apparatus at least to prepare the second control information such that it depends on whether or not the drain capability information corresponds to the source capability information.

12. The apparatus according to claim 8, wherein the at least one memory and the computer program code are configured to, with the at least one processor, cause the apparatus at least to prepare the first control information additionally based on at least one of a relative priority between the policy and charging enforcement function and the traffic detection function, and/or a user profile of a user accessing the service.

13. The apparatus according to claim 8, wherein the first control information comprises an instruction to activate the drain capability to be controlled.

14. The policy control point, comprising an apparatus according to claim 8.

15. A system, comprising
a control apparatus according to claim 8;
the traffic detection function of the control apparatus, and the policy and charging enforcement function of the control apparatus, wherein the traffic detection function has a drain capability to enforce the policy for the service and/or to detect the traffic and/or to detect the service and is configured to activate the drain capability on response to the first control information, the policy and charging enforcement function has a source capability to enforce the policy for the service and/or to detect a traffic and/or to detect the service and is configured to provide, to the control apparatus, the source capability information, and the source capability information is related to the source capability.

16. A method, comprising
enforcing, by a policy and charging enforcement function's (PCEF) own capability, a policy for a service in a communication system and/or detecting a traffic and/or detecting the service;

determining whether the PCEF's own capability is to be activated, based on the PCEF's own capability and a control information on a capability to be controlled for enforcing the policy, and/or for detecting the traffic, and/or for detecting the service, and based on information of a capability of a traffic detection function to enforce the policy, and/or detect the traffic, and/or to detect the service in a communication system, wherein the control information is received from a steering apparatus; and activating the PCEF's own capability for the service depending on a result of the determination.

17. The method according to claim 16, wherein it is determined not to activate the PCEF's own capability if the PCEF's own capability corresponds to the capability to be controlled.

18. The method according to claim 16, wherein it is determined to activate the PCEF's own capability for the service if the PCEF's own capability corresponds to the capability to be controlled.

19. The method according to claim 16, further comprising providing an information about the PCEF's own capability to the steering apparatus.

20. A computer program, embodied on a non-transitory computer readable storage medium, the computer program, when executed by a processor, causes the processor to perform the method according to claim 16.

21. A method, comprising
controlling a policy for a service in a communication system and/or detecting a traffic and/or detecting the service;

preparing a first control information about a drain capability to be controlled for enforcing the policy, wherein the first control information is based on a source capability information received from a policy and charging enforcement function;

providing, to a traffic detection function, the first control information, wherein the policy and charging enforcement function is different from the traffic detection function; and detecting that a request for a source call control of the service is received from the policy and charging enforcement function and a request for a drain call control of the service is received from the traffic detection function, wherein the first control information prepares the first control information only if it is detected that both the request for the drain call control and the request for the source call control are received, and wherein if the first control information is not provided to the traffic detection function, the method further comprises providing, to the traffic detection function, a second control information about a source capability to enforce a policy.

22. The method according to claim 21, wherein the first control information is prepared such that it depends on whether or not the source capability information corresponds to a drain capability information received from the traffic detection function.

23. The method according to claim 22, further comprising
preparing a second control information about a source capability to be controlled for enforcing the policy, wherein the second control information is based on the drain capability information; and providing, to the policy and charging enforcement function, the second control information.

24. The method according to claim 23, wherein the second control information is prepared such that it depends on whether or not the drain capability information corresponds to the source capability information.

25. The method according to claim 21, wherein the first control information is prepared additionally based on at least one of a relative priority between the policy and charging enforcement function and the traffic detection function, and/or a user profile of a user accessing the service.

26. The method according to claim 21, wherein the first control information comprises an instruction to activate the drain capability to be controlled.

\* \* \* \* \*